(12) United States Patent
Yan et al.

(10) Patent No.: US 8,795,009 B1
(45) Date of Patent: Aug. 5, 2014

(54) WATERCRAFT WITH PROPULSION SYSTEM

(76) Inventors: Gaofei Yan, Sunrise, FL (US); James Dees, Sunrise, FL (US)

(*) Notice: Subject to any disclaimer, the term of this patent is extended or adjusted under 35 U.S.C. 154(b) by 290 days.

(21) Appl. No.: 13/207,772

(22) Filed: Aug. 11, 2011

Related U.S. Application Data

(63) Continuation-in-part of application No. 12/952,703, filed on Nov. 23, 2010, now Pat. No. 7,997,059, which is a continuation-in-part of application No. 12/054,627, filed on Mar. 25, 2008, now Pat. No. 7,836,678.

(60) Provisional application No. 60/920,096, filed on Mar. 26, 2007.

(51) Int. Cl.
*B63H 11/00* (2006.01)

(52) U.S. Cl.
USPC ............................. 440/38; 114/67 A; 114/288

(58) Field of Classification Search
USPC ................... 114/67 A, 338, 288, 289; 440/38
See application file for complete search history.

(56) References Cited

U.S. PATENT DOCUMENTS

| | | | | |
|---|---|---|---|---|
| 1,771,402 A | * | 7/1930 | De Spuches | 440/38 |
| 3,841,258 A | * | 10/1974 | Odawara | 440/40 |
| 4,902,254 A | * | 2/1990 | Chas | 440/38 |
| 5,035,377 A | | 7/1991 | Buchelt | |
| 6,293,218 B1 | * | 9/2001 | White | 114/288 |
| 6,427,618 B1 | * | 8/2002 | Hilleman | 114/338 |
| 6,616,094 B2 | | 9/2003 | Illingworth | |
| 6,662,549 B2 | * | 12/2003 | Burns | 60/204 |
| 6,725,797 B2 | * | 4/2004 | Hilleman | 114/337 |
| 6,948,439 B2 | * | 9/2005 | Burg | 114/67 A |
| 6,957,620 B1 | * | 10/2005 | Wheeler | 114/67 A |
| 6,974,106 B2 | | 12/2005 | Churchman | |
| 7,594,835 B2 | * | 9/2009 | Gruenwald | 440/69 |
| 2001/0040062 A1 | * | 11/2001 | Illingworth | 180/117 |

* cited by examiner

*Primary Examiner* — Lars A Olson
*Assistant Examiner* — Jovon Hayes
(74) *Attorney, Agent, or Firm* — Allen D. Hertz, P.A.; Allen D. Hertz

(57) ABSTRACT

A watercraft has an elongate hull having an arcuately shaped bow and a propulsion system including a flow generator coupled thereto. A shroud extends below a forward portion of the hull, and in combination with said hull defines a conduit therethrough with the flow generator positioned in the conduit. The arcuately shaped bow and the conduit in combination at least partially form a funnel shaped forward-to-aft fluid path for water flow induced by the flow generator. The flow generator in operation produces a forward thrust vector and a Bernoulli thrust vector created by the forward-to-aft fluid flow of water flow along the partial funnel shaped forward-to-aft fluid path.

23 Claims, 12 Drawing Sheets

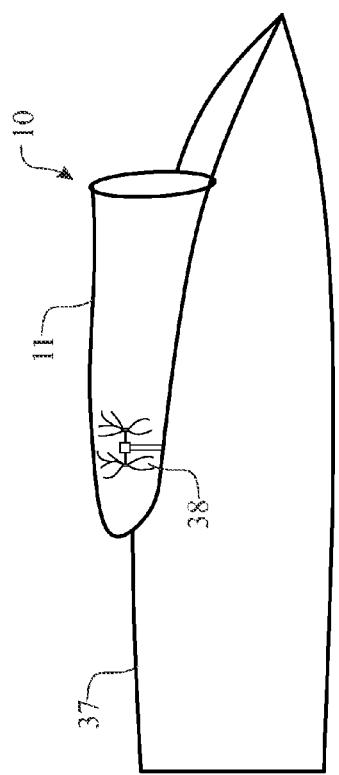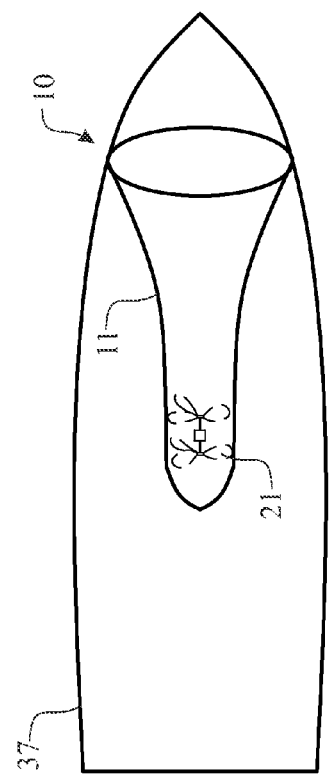

WATERCRAFT WITH PROPULSION SYSTEM

CROSS-REFERENCE TO RELATED APPLICATION

This is a Continuation In Part Patent Application claiming the benefit of Divisional patent application Ser. No. 12/952,703, filed Nov. 23, 2010, issuing as U.S. Pat. No. 7,997,059 on Aug. 16, 2011, which claims the benefit of U.S. Non-Provisional patent application Ser. No. 12/054,627, filed on Mar. 25, 2008, which issued as U.S. Pat. No. 7,836,678 on Nov. 23, 2010, which claims the benefit of U.S. Provisional Patent Application Ser. No. 60/920,096, filed Mar. 26, 2007, which are incorporated herein in their entirety.

BACKGROUND OF THE INVENTION

1. Field of the Invention

The present invention relates generally to a propulsion system for use as a means of propulsion to propel a vehicle, or for use as a vehicle, in liquid or gas fluid, and more particularly relates to a propulsion system having a rotor (or other known device) confined in (or around) a funnel-shaped conduit that is configured to produce a lift force by combining thrust from the rotor with the lift force created by drawing fluid into the funnel-shaped conduit, and, optionally, across an airfoil-shaped wing, whereby movement can be executed vertically or horizontally.

2. Description of the Prior Art

While air transportation has become ever more popular, neither conventional airplanes nor helicopters are usable in all situations.

Helicopters are difficult to control, especially in windy conditions, and are particularly vulnerable to accidents or crashes at landing or during take off. They are limited in speed, due to their inherent design.

Conventional airplanes are not highly maneuverable. They cannot stop in mid-air; neither can they turn quickly in any direction. Conventional airplanes are inappropriate for use as personal transport devices, such as might be used by one or two passengers to travel to work. As they require a runway to take off and to land, they are generally unsuitable for use in congested or heavily populated regions, in inner cities or industrial areas, in storm or emergency damage surveys, in rugged or forested terrain, or in other unimproved environments.

Additionally, conventional airplanes cannot hover to provide a stable, yet rotatable platform, such as would be desirable for filming, for holding monitoring or scientific equipment in position, or for supporting weapons in a manner in which the weapons could be aimed and fired in any direction.

Moreover, conventional airplanes present safety concerns. If power is lost, a conventional aircraft will have trouble landing safely. Also, any impact will generally result in a crash. Conventional airplanes also can go into a stall, whereupon the controls are ineffective and accidents are prevalent.

Further, conventionally available or proposed disc-shaped flying aircraft, such as a flying car, are inherently unstable and inefficient. This is because disc-shaped flying aircraft using only a ducted fan to produce lift force can only produce force due to Newton's third law, which is inefficient in this application. The present invention solves this problem by attaching a funnel on it, which can give additional 70% or more thrust due to the Bernoulli's effect (FIG. 7) in tests (FIG. 5, FIG. 6).

The present invention advantageously provides safer air travel and provides a system whereby, in the event of a loss of power, the aircraft would be configured to float down safely through the air from a height—due to air resistance reducing the velocity of its fall, in a similar manner to a parachute. Furthermore, the present invention provides a system whereby minor or no damage would be sustained during a low speed collision.

The current invention can be applied both to underwater travel and to water surface travel.

In the area of underwater movement of persons or materials, submarines are typically used. The steam-powered, diesel-powered, electric-powered, or nuclear-powered engine conventionally drives a propeller that moves the submarine through the water by pushing against the water and creating a forward force. To keep the long cigar-shaped submarine level both on the surface of the ocean plus at any depth, presents problems. A complex system using hydroplanes and various air and water tanks is employed to keep the submarine level both while it is stationary and while it is traveling through the water. The present invention allows underwater transport in a less complex and more stable vehicle. Newton's laws of motion consist of three physical laws that form the basis for classical mechanics. They describe the relationship between the forces acting on a body and its motion due to those forces. They have been expressed in several different ways over nearly three centuries, and can be summarized as follows:

1. First law: Every body remains in a state of rest or uniform motion (constant velocity) unless it is acted upon by an external unbalanced force. This means that in the absence of a non-zero net force, the center of mass of a body either remains at rest, or moves at a constant speed in a straight line.
2. Second law: A body of mass m subject to a force F undergoes an acceleration a that has the same direction as the force and a magnitude that is directly proportional to the force and inversely proportional to the mass, i.e., $F=ma$. Alternatively, the total force applied on a body is equal to the time derivative of linear momentum of the body.
3. Third law: The mutual forces of action and reaction between two bodies are equal, opposite and collinear. This means that whenever a first body exerts a force F on a second body, the second body exerts a force $-F$ on the first body. F and $-F$ are equal in magnitude and opposite in direction. This law is sometimes referred to as the action-reaction law, with F called the "action" and $-F$ the "reaction". The action and the reaction are simultaneous.

Respective to Newton's laws, the energy required to propel a watercraft must overcome two different resistance forces, specifically wave resistance and friction resistance.

Resistance imposed by the water affects vessel propulsion through water. This resistance can be broken down into several components, the main ones being (1) the friction of the water on the hull and (2) wave making resistance. To reduce resistance and therefore increase the speed for a given power, it is necessary to overcome both of these key contributors to the resistance. The first known means to reduce frictional resistance is to reduce the wetted surface of the hull. The second known means is to and use submerged hull shapes that produce low amplitude waves, such as a bulbous bow. Examples of effective hull designs are high-speed vessels that are often more slender, with fewer or smaller appendages.

A simple way of considering wave-making resistance is to look at the hull in relation to its wake. At speeds lower than the wave propagation speed, the wave rapidly dissipates to the sides. As the hull approaches the wave propagation speed, however, the wake at the bow begins to build up faster than it can dissipate, and so it grows in amplitude. Since the water is not able to "get out of the way of the hull fast enough", the hull, in essence, has to climb over or push through the bow wave. This results in an exponential increase in resistance with increasing speed.

Wave making resistance is a form of drag that affects surface watercraft, such as boats and ships, and reflects the energy required to push the water out of the way of the hull. This energy goes into creating the wake. For small displacement hulls, such as sailboats or rowboats, wave-making resistance is the major source of drag. The unique properties of deepwater waves (where the water depth is deeper than half the wavelength) mean that the wave making resistance is very dependent upon the hull's interaction with the wake. Reducing the displacement of the craft, by eliminating excess weight, is the most straightforward way to reduce the wave making drag. Another way is to shape the hull so as to generate lift as it moves through the water. Semi-displacement hulls and planing hulls do this, and they are able to break through the hull speed barrier and transition into a realm where drag increases at a much lower rate. The downside of this is that planing is only practical on smaller vessels, with high power to weight ratios, such as motorboats. It is not a practical solution for a large vessel such as a supertanker.

Another problem in water transport systems is inertial cavitation, such as may occur behind the blade of a rapidly rotating propeller due to collapsing voids or bubbles and may cause damage to components, vibrations, noise, and a loss of efficiency. The present invention eliminates cavitation problems.

Additionally, the present invention provides a personal underwater transport system for divers that would increase safety while being easy to operate and maneuver.

Further, the present invention can be connected to either air or water vehicles to increase force and to increase safety. Thus the present invention can also be applied to water surface travel, such as, for example, applications to conventional boats and ships.

Accordingly, there is an established need for a fluid dynamically efficient propulsion system, as herein presented, that improves safety and maneuverability in any fluid—in air, providing hovering flight with a stable, rotatable platform and providing vertical takeoff and landing; and in water, providing an easy to level, control, and operate vehicle.

SUMMARY OF THE INVENTION

The present invention is directed to a fluid dynamically efficient propulsion system, having a rotor confined in a funnel-shaped conduit that is capable of providing a lift force to lift itself, or to lift a vehicle or cargo, in liquid or gas fluid. The propulsion system includes a vertically extending funnel-shaped conduit, a flow generator, a power source, and, optionally, an annular airfoil-shaped wing or a wing formed in any of a variety of other configurations. The funnel-shaped conduit has an upper edge that defines a fluid inlet and has a lower edge that defines a fluid outlet, with the upper fluid inlet larger than the lower fluid outlet. The annular airfoil-shaped wing is preferably connected to and circumferentially surrounds the funnel-shaped conduit upper edge.

Driven by the power source, the flow generator (either rotor-type or other type) is rotatably and operably mounted about the axis of the funnel-shaped conduit, and, by its action in the fluid, produces thrust, which provides motion to the vehicle. The flow generator is configured to force the fluid, such as air or water, from the fluid inlet rearward through the fluid outlet. The flow generator draws the fluid across the annular airfoil-shaped wing and inwardly through the fluid inlet forcing it rearward through the axially-extending funnel-shaped conduit to exit out of the fluid outlet.

The propulsion system of the present invention creates force by combining thrust, in a new and unique way, with the movement caused by the difference between the speed of the fluid inside of the funnel as compared to the speed of the fluid outside the funnel, whereby forward movement can be executed vertically or horizontally.

The propulsion system can optionally include a load container or a pilot and passenger area.

An object of the present invention is to provide a propulsion system that can be increase force.

A further object of the present invention is to provide a propulsion system that reduces fluid dynamic drag.

Another object of the present invention is to provide a propulsion system that is adapted to eliminate cavitation in water applications.

An additional object of the present invention is to provide a propulsion system that can be adapted for use as a stable, rotatable platform.

Another object of the present invention is to provide a propulsion system that is adapted for use in any liquid or gas fluid environment, for example, in air or in water.

A further object of the present invention is to provide a propulsion system that, when used in air, increases landing safety if power is lost.

An additional object of the present invention is to provide a propulsion system that is configured to quickly and safely provide vertical takeoff and landing.

Another object of the present invention is to provide a propulsion system that is configured, when used underwater, to more easily level an underwater transport device.

Another object of the present invention is to provide a propulsion system that is configured, when used underwater, to more easily level an underwater transport device.

An additional object of the present invention is to provide a propulsion system that is configured to be used on the surface of the water.

A further object of the present invention is to provide a propulsion system that increases fuel efficiency (tested at 70% increase in thrust force with same amount energy input) and power.

Yet another aspect of the invention is a watercraft having an elongate hull with an arcuately shaped bow and a propulsion system including a flow generator coupled thereto. A shroud extends below a forward portion of the hull, and in combination with said hull defines a conduit therethrough with the flow generator positioned in the conduit. The arcuately shaped bow and the conduit in combination at least partially form a funnel shaped forward-to-aft fluid path for water flow induced by the flow generator. The flow generator in operation produces a forward thrust vector and a Bernoulli thrust vector created by the forward-to-aft fluid flow of water flow along the partial funnel shaped forward-to-aft fluid path.

Another object of the present invention is to provide a watercraft wherein the conduit defined by the shroud is funnel shaped defining a large opening at a forward end of the conduit and a small opening at an aft end of the conduit.

A further object of the present invention provides a watercraft where the flow generator is positioned at the small opening at the aft end of the conduit.

Yet another object of the present invention is to provide a watercraft where the flow generator is a propeller.

An additional object of the present invention is to provide a watercraft wherein the flow generator comprises two propellers.

Yet another object of the present invention is to provide a watercraft wherein the flow generator is a waterjet.

Another object of the present invention is to provide a watercraft wherein the bow is convexly arcuate.

Yet a further object of the present invention is to provide a watercraft where the hull defines a concave stern.

Yet another object of the present invention is to provide a watercraft having a directional control mechanism below an aft portion of the hull.

Another object of the present invention is to provide a watercraft wherein the directional control mechanism is a controllable rudder.

Yet another object of the present invention is to provide a watercraft wherein the rudder is positioned aft of the flow generator and within an aft flowing stream of water exiting from the flow generator to function as a stator to stabilize the aft flowing stream of water.

These and other objects, features, and advantages of the present invention will become more readily apparent from the attached drawings and from the detailed description of the preferred embodiments, which follow.

BRIEF DESCRIPTION OF THE DRAWINGS

The preferred embodiments of the invention will hereinafter be described in conjunction with the appended drawings, provided to illustrate and not to limit the invention, where like designations denote like elements, and in which:

FIG. 4A is a side view showing a third embodiment of the propulsion system of the present invention in an underwater application;

FIG. 4B is a top view showing the third embodiment of the propulsion system of the present invention in an underwater application;

Like reference numerals refer to like parts throughout the several views of the drawings.

DETAILED DESCRIPTION OF THE PREFERRED EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front". "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an aerodynamically efficient propulsion system that is capable of increasing force and, when used in air transport, is capable of vertical takeoff and landing and of hovering flight, providing a maneuverable, stable, rotatable platform. The propulsion system 10 of the present invention is configured to provide a forward force to move or lift itself and a vehicle or cargo in any liquid or gas fluid environment, such as air or water.

Figure 1:
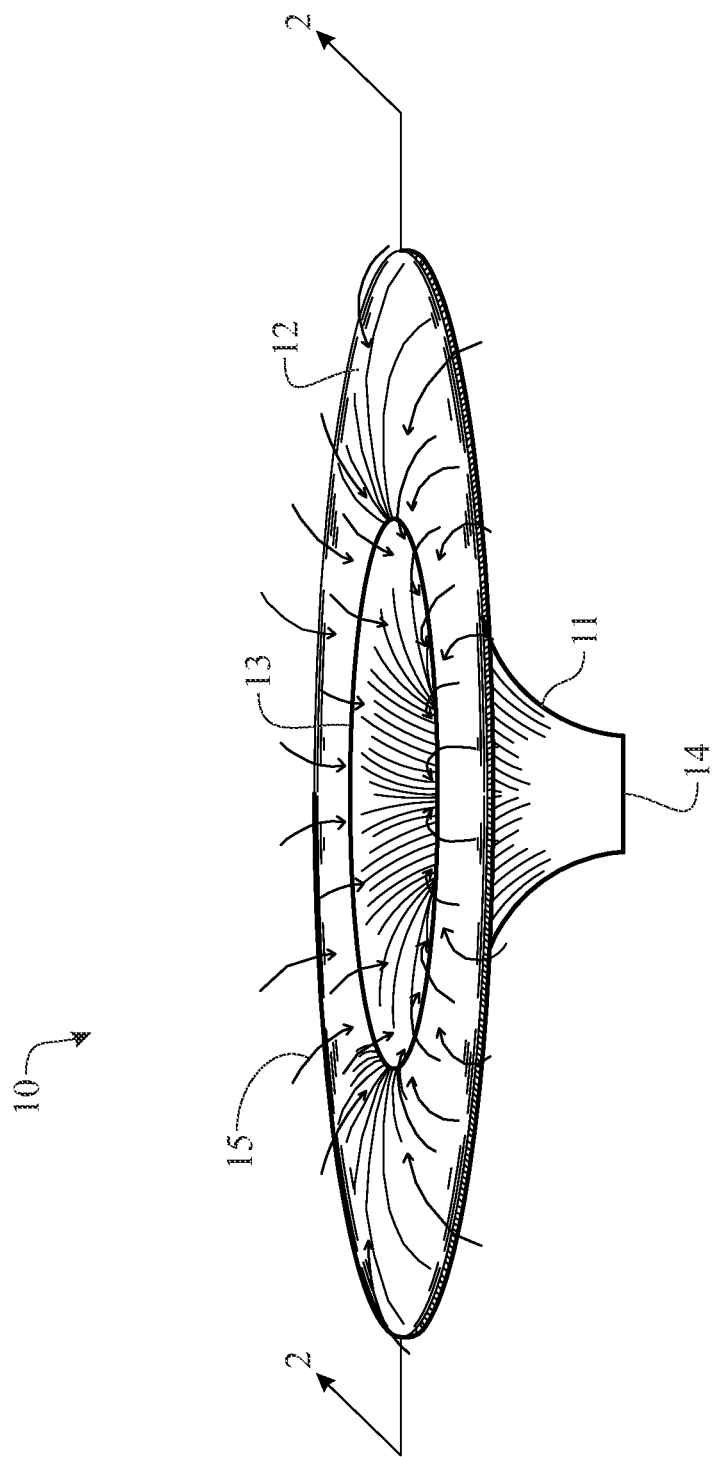
FIG. 1 is a perspective view showing a first preferred embodiment of the propulsion system of the present invention.
Figure 2:
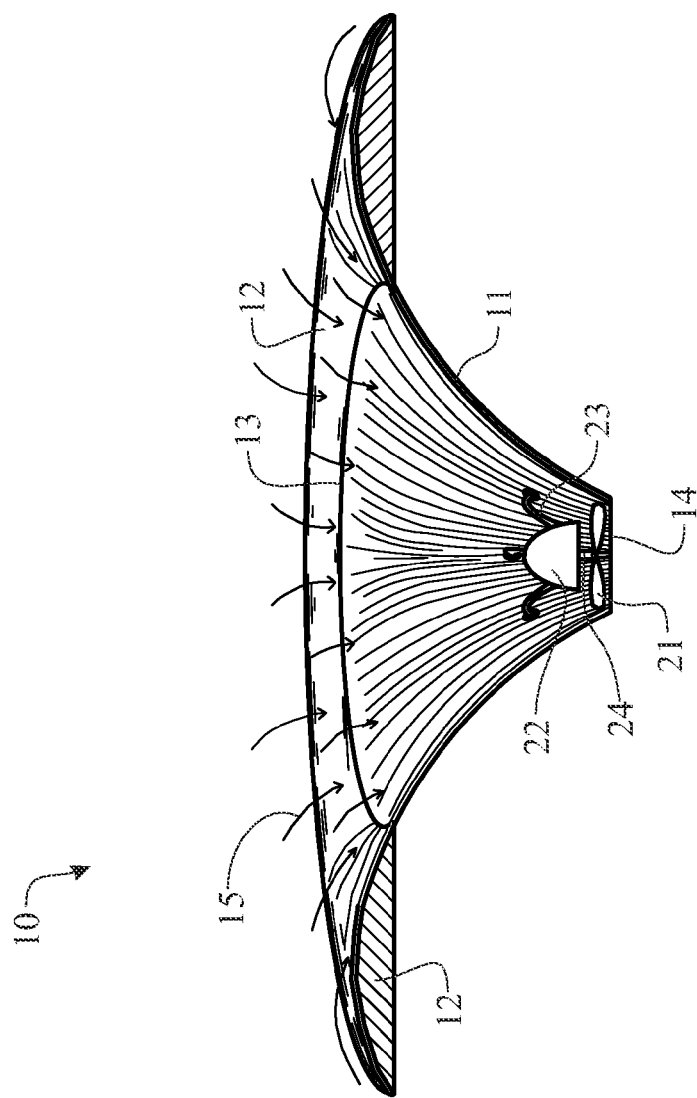
FIG. 2 is a partial cut-away view, taken along lines 2-2 of FIG. 1) showing the first preferred embodiment of the propulsion system of the present invention.

Referring now to FIG. 1 and FIG. 2, a propulsion system, shown generally as reference number 10, is illustrated in accordance with a first preferred embodiment of the present invention. As shown, the propulsion system 10 includes a funnel-shaped conduit 11, an airfoil-shaped wing 12, a flow generator 21 (FIG. 2), and a power source 22 (FIG. 2).

The funnel-shaped conduit 11 is configured as a fluid passageway that is substantially shaped as a truncated cone, or funnel with open ends. The upper edge of the funnel-shaped conduit 11 defines a fluid inlet 13, while the lower edge of the funnel-shaped conduit 11 defines a fluid outlet 14 that is smaller than the fluid inlet 13. The funnel-shaped conduit 11 is configured to allow generally uninterrupted rearward flow of the liquid or gas fluid from the fluid inlet 13 through the passageway of the funnel-shaped conduit 11, with the fluid exiting out of the fluid outlet 14.

The airfoil-shaped wing 12 is connected to the funnel-shaped conduit 11 in the area of the fluid inlet 13. The airfoil-shaped wing 12 extends circumferentially around, and is attached to or formed integrally with, the upper edge of the funnel-shaped conduit 11. As best seen in the cutaway diagram of FIG. 2, the airfoil-shaped wing 12 is formed in a conventional airfoil shape. The precise size and dimensions of airfoil-shaped wing 12 are determined by the specific application of the propulsion system 10 of the present invention, as well as by the particular fluid environment of application of the invention.

Airfoil-shaped wing 12 is configured to supply a lift force when fluid is drawn across the upper surface. Airfoil-shaped wing 12 may be integrally formed with the axially-extending funnel-shaped conduit 11 during manufacture, or may be securely joined via fasteners such as screws, nails, rivets, adhesives, welding, or other fastening modalities. Additionally, although airfoil-shaped wing 12 is illustrated as extending in a ring circumferentially around the fluid inlet 13 of the funnel-shaped conduit 11, one or more partial airfoil-shaped wings encompassing only a portion of a circumferential ring around the fluid inlet 13 of the funnel-shaped conduit 11, are within the scope of the invention. The one or more partial airfoil-shaped wings are configured to provide sufficient surface area to supply a lift force when fluid is drawn across their upper surfaces.

The axially-extending funnel-shaped conduit 11 and the airfoil-shaped wing 12 may be formed of a single material, a composite material, or multiple layers. The conventionally available materials used will vary depending on a variety of application specific factors, such as, for example, the fluid environment in which the propulsion system is utilized.

Power source 22 provides the energy to the propulsion system 10. The power source 22 is preferably mounted within the axially-extending funnel-shaped conduit 11. Supports 23 are illustrated as one example of attachment means. The supports 23 secure the power source 22 in a position to power the flow generator 21 with minimal restriction of fluid flow through the axially-extending funnel-shaped conduit 11. An axially-extending cylindrical structure 24 connects power source 22 to flow generator 21. Structure 24 may rigidly connect power source 22 to flow generator 21, or may provide for movable positioning of flow generator 21.

It will be appreciated by those skilled in the art that any of a variety of different power sources 22 may be utilized without departing from the present invention. For example, power source 22 may be a motor, engine, or any conventional machine for converting energy into mechanical force or motion. Power source 22 may use any conventional energy source, for example, electrical energy, gasoline, diesel, human power, or the like.

The flow generator 21 is rotatably mounted about the axis of the funnel-shaped conduit 11 and is configured to force the liquid or gas fluid, such as air or water, from the fluid inlet 13 rearward through the passageway of the funnel-shaped conduit 11 to exit out of the fluid outlet 14. The flow generator 21 may be, for example, a propeller, a turbine, a fan, another machine having a rotor with vanes or blades, or other fluid moving apparatus. When the propulsion system is used in air transport, the axis of rotation of the vanes or blades of flow generator 21 is generally perpendicular to the ground.

A forward lift force is produced as the flow generator 21 draws the fluid across the airfoil-shaped wing 12 and inwardly through the fluid inlet 13, as demonstrated by fluid flow arrows 15. Then the flow generator 21 forces the fluid through the funnel-shaped conduit 11 to exit out of the lower end of the funnel-shaped conduit 11 at fluid outlet 14. The flow generator 21 is positioned in such a way as to provide a relative pressure difference between the outside of the propulsion system and the inside of the propulsion system, with the rate of fluid flow being faster inside the funnel-shaped conduit 11 than outside the funnel-shaped conduit 11. Thus the difference between the speed of the fluid on the inside of the funnel as compared to the speed of the fluid outside the funnel produces a lifting force due to the Bernoulli Principle (FIG. 7).

Figure 7:
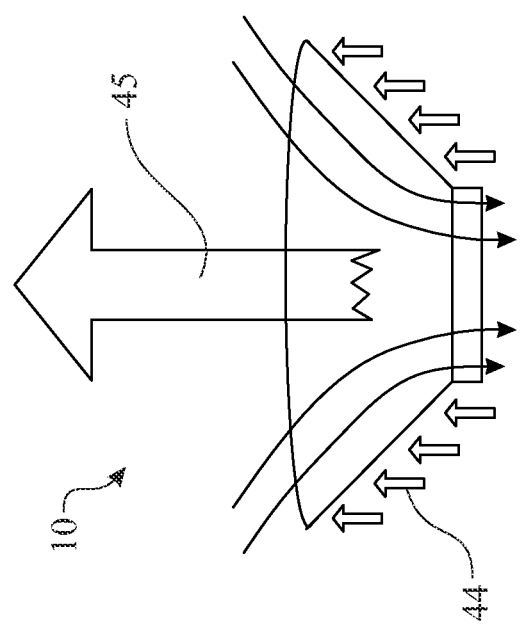
FIG. 7 is a schematic showing the third embodiment of the present invention with arrows designating the force due to Bernoulli's Principle 44 and the force due to Newton's Third Law 45.

Additionally, the rotation of the airfoil-shaped blades of the flow generator produces a lifting force or thrust that acts at right angles to the fluid stream, due to Newton's Third Law 45 (FIG. 7). The forward lift force of the propulsion system is created by the combination of these two forces 44, 45.

The forward lift force thereby produced can be applied to an existing vehicle or to a vehicle especially designed to utilize the capabilities of the propulsion system 10 of the present invention. It can be used to lift a vehicle, passengers, or other cargo, either in air or in water or in other fluids. Whether used in gas or in liquid, the propulsion system 10 utilizes a uniquely effective method for reducing aerodynamic drag.

Figure 3:
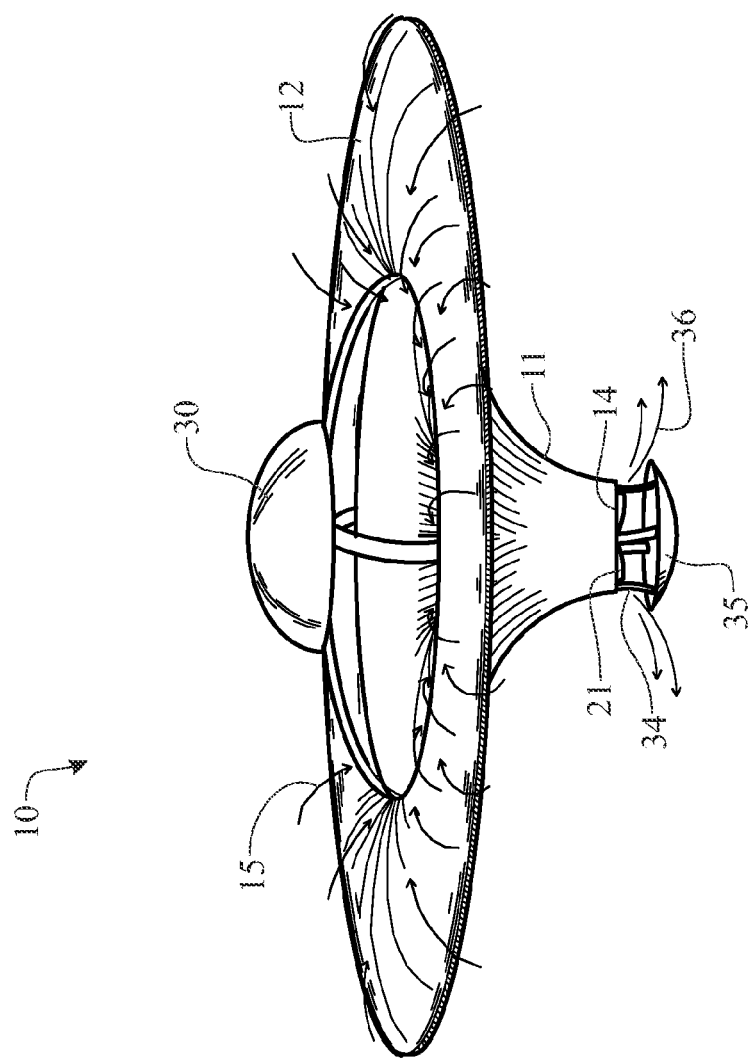
FIG. 3 is a perspective view showing a second embodiment of the propulsion system of the present invention.

FIG. 3 illustrates a second exemplary embodiment of the propulsion system 10 of the present invention. The propulsion system 10 of the second exemplary embodiment operates in a similar manner to the first exemplary embodiment of FIG. 1 to FIG. 2. However, the propulsion system 10 of the second embodiment additionally provides an enclosed housing 30 for transporting persons or cargo. Additionally illustrated is a variation of the positioning of flow generator 21, which is disposed within funnel-shaped conduit 11 in a lower position, extending slightly below funnel-shaped conduit 11. Furthermore, an optional cover 35 supported by cover supports 34 is illustrated.

Enclosed housing 30 is disposed above funnel-shaped conduit 11, extending radially about the axis of funnel-shaped conduit 11 in an overall balanced configuration. Enclosed housing 30 is securely attached to the funnel-shaped conduit 11 via support structures 33 by means of conventional fasteners such as screws, nails, rivets, adhesives, welding, or other fastening modalities. To allow access into the interior, enclosed housing 30 is configured with an entry door (not shown). Enclosed housing 30 is configured to be waterproof if the propulsion system 10 is to be used in an underwater environment, or configured with appropriate lightweight materials if the propulsion system 10 is to be used for flying. Enclosed housing 30 may be utilized as a compact passenger compartment for a pilot or for a pilot and one or more passengers, or may be utilized as a load container for hauling cargo, materials, or the like.

Cover 35 is a designed as a rigid protective covering configured to guard the opening at the fluid outlet 14 of the funnel-shaped conduit 11. Cover 35 is included if appropriate to the situation of the application of the present invention, for example, to provide protection to the flow generator 21, such as in a flying tank application. One or more cover supports 34 are installed to support the cover 35 a significant distance from the fluid outlet 14, to allow the fluid to be discharged toward the sides of fluid outlet 14, as illustrated by arrows 36.

The propulsion system of the present invention produces lift force due to both Bernoulli's Principle 44 and the force due to Newton's Third Law 45, as shown in FIG. 7. Therefore, when the outlet is covered in some environment for any reason, which causes the fluid to be discharged toward the sides, there is still lift force due to Bernoulli's principle. This is so in spite of the fact that there is not much thrust force attributable to Newton Third Law's. This unique design allows a flying tank to become possible when the flow generator 21 is configured to be sufficiently strong. This ability to be utilized as a flying tank is in contrast to a helicopter. A helicopter's rotors are exposed outside, so they are vulnerable regardless of how strong the engine is; therefore, a helicopter is not practical as a flying tank.

In other aspects, the propulsion system 10 of the second exemplary embodiment is substantially similar to the propulsion system 10 of the first exemplary embodiment described above, utilizing the difference between the speed of the fluid on the inside of the funnel as compared to the speed of the fluid outside the funnel to produce a lifting force due to the Bernoulli Principle (FIG. 7).

FIG. 4A (side view) and FIG. 4B (top view) illustrate a third exemplary embodiment of the propulsion system 10 (inside funnel-shaped conduit 11) of the present invention. The propulsion system 10 of the third exemplary embodiment operates in a similar manner to the first exemplary embodiment of FIG. 1 to FIG. 2. However, the propulsion system 10 of the third embodiment illustrates the propulsion system 10 in application in an underwater situation with elimination of cavitation problems, the omission of airfoil-shaped wing 12, and a variation in the rotor blades of flow generator 21 and in the location of the power source 22.

The propulsion system 10 can be attached or incorporated into a variety of conventional existing air and water vehicles and mediums of transport, such as submarines, ships, or boats, via a propulsion system support 38 suitable for the particular application.

The shape, size, number, and configuration of the airfoil-shaped blades of the flow generator, can be varied depending on the specific application. For example, thin, low-drag, low-lift blades may be employed for faster speed, while thicker blades may be used to transport heavier loads. Furthermore, the size, shape, and configuration of the wing 12 (FIG. 2) can be varied to achieve the desired outcome. In FIG. 4A and FIG. 4B wing 12 is eliminated entirely leaving the end of funnel-shaped conduit 11 as the most outward facing projection, but alternatively, wing 12 can be merely minimized to a small lip (not illustrated).

The power source 22 is illustrated as external to funnel-shaped conduit 11.

In other aspects, the third exemplary embodiment is substantially similar to the first exemplary embodiment described above.

Figure 5:
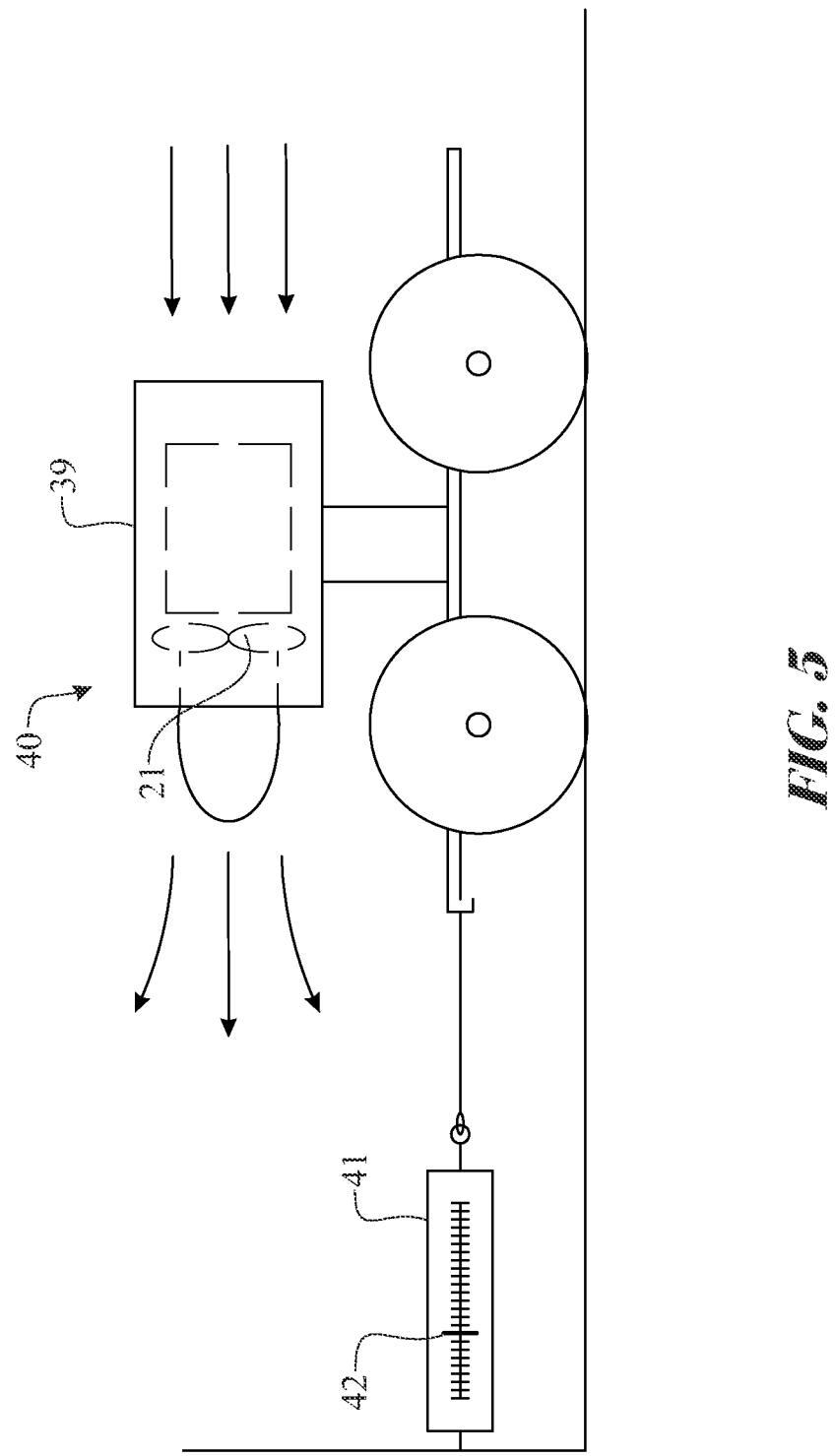
FIG. 5 is a schematic showing a small wheeled cart used as control system for a comparison test.
Figure 6:
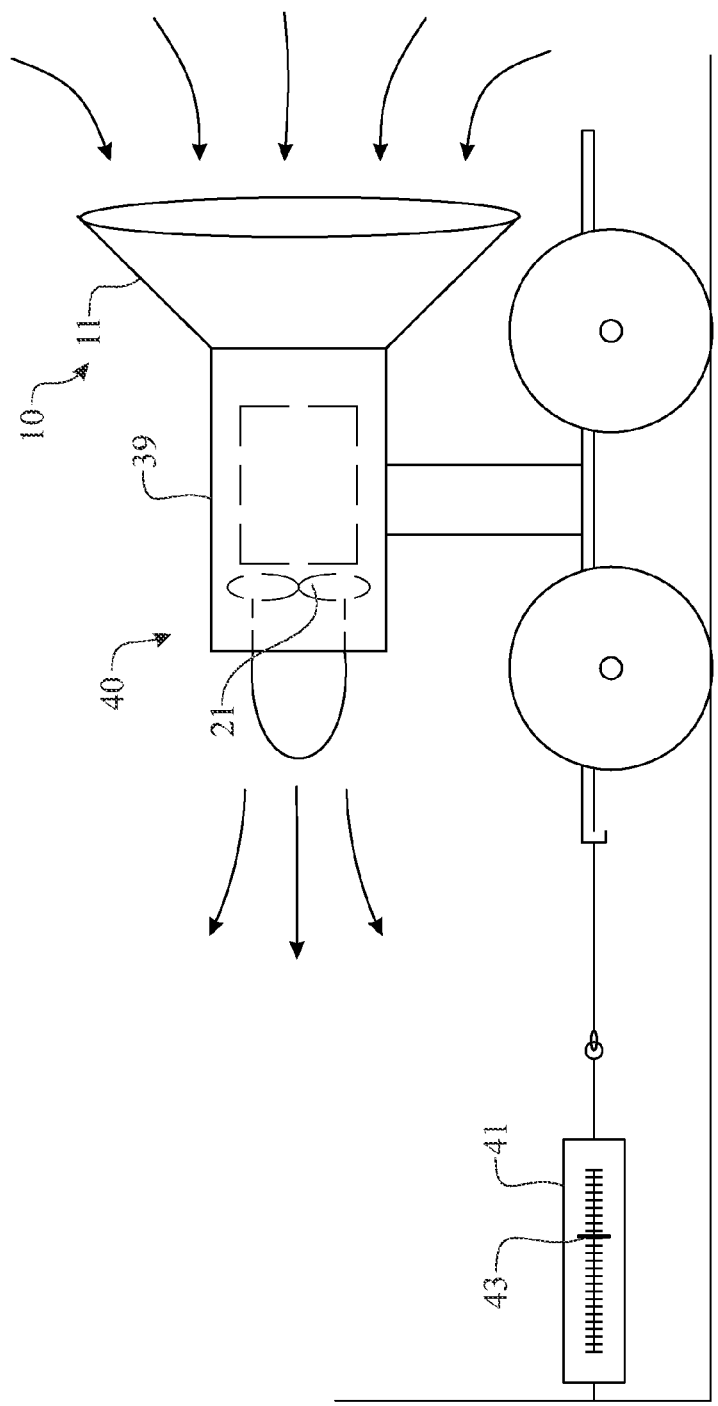
FIG. 6 is a schematic showing the third embodiment of the present invention in application on a small wheeled cart, illustrating increased force achieved as compared to the control system of FIG. 5.

Referring now to FIG. 5 and FIG. 6, the increase in force achieved by utilization of the propulsion system 10 of the present invention is demonstrated. In the experiment shown in FIG. 5 and FIG. 6, a small wheeled cart 39 was attached to a scale 41 to measure force and was powered by an electrical motor, but only in FIG. 6 is the propulsion system 10 used. Using the same power source, the force 43 (FIG. 6), as measured by scale 41, was significantly greater (approximately 70% greater) using the propulsion system 10 (as in FIG. 6) as compared to the force 42 without using the propulsion system (as in FIG. 5).

In the three exemplary embodiments of the propulsion system 10 presented, the elements herein shown are for illustrative purposes only and it will be appreciated by those skilled in the art that a variety of other component configurations may also be utilized without departing from the present invention. The specific configuration used will depend upon a variety of application factors including, for example, the type and density of the fluid. Although the propulsion system 10 is herein illustrated with the power source 22 inside the funnel-shaped conduit 11, alternatively power source 22 can be located below or otherwise externally to the funnel-shaped conduit 11. To maintain a balanced weight distribution, however, if components are not mounted about the axis of the funnel-shaped conduit 11, additional weights (not shown) can be supplied to counteract the off-center weight distribution.

Changing the direction of the fluid flow can maneuver the propulsion system 10. For example, by reversing the direction of the flow generator 21 the direction of the fluid flow is reversed and the propulsion system 10 would provide an opposite, or rearward, movement. Alternatively, changing the axis of the flow generator 21 to be somewhat deviated from the axis of the funnel-shaped conduit 11 will proportionally modify the forward lift direction. Tilting the rotor of the flow generator 21 can control the direction of movement, thus providing both vertical and horizontal directional control. In air, the propulsion system 10 can improve vertical takeoff and landing and hovering, as well as being adapted for use as a stable, rotatable platform. Further the propulsion system 10 is maneuverable by shifting the distribution of weight, thus providing additional directional control.

Additionally, the propulsion system is inherently stable due to the balanced weight distribution, thereby increasing safety. The configuration of the conduit 11 and wing 12 also provide further enhancements to the safety of the vehicle. For instance, upon loss of power, conduit 11 and wing 12 work together to enable the vehicle equipped with the propulsion system 10 of the current invention to float down safely through the air from a height, with the air resistance provided by conduit 11 and wing 12 reducing the rearward velocity, in a similar manner to a parachute. Furthermore, the low center of mass of the propulsion system encourages the system to remain upright upon loss of power, thereby increasing vehicle safety. In addition, the configuration of the propulsion system 10 provides a system that decreases or eliminates damage to the vehicle during a low speed collision. For example, in contrast to a helicopter with exposed rotors that are damaged in even a very low speed collision, the rotors of the enclosed flow generator 21 are protected.

When used underwater, the propulsion system promotes a stable and easily maneuvered underwater transport device that can be used for numerous recreational activities and business activities, such as investigating ancient shipwrecks or downed airplanes, burying underwater cables in the sea floor, studying marine life or ocean currents, or repairing offshore oil well platforms.

From the foregoing, it will be apparent that the propulsion system 10 of the current invention provides a propulsion system that can be utilized on many existing vehicles, as well as on vehicles or transport devices specifically designed for its application.

Figure 8:
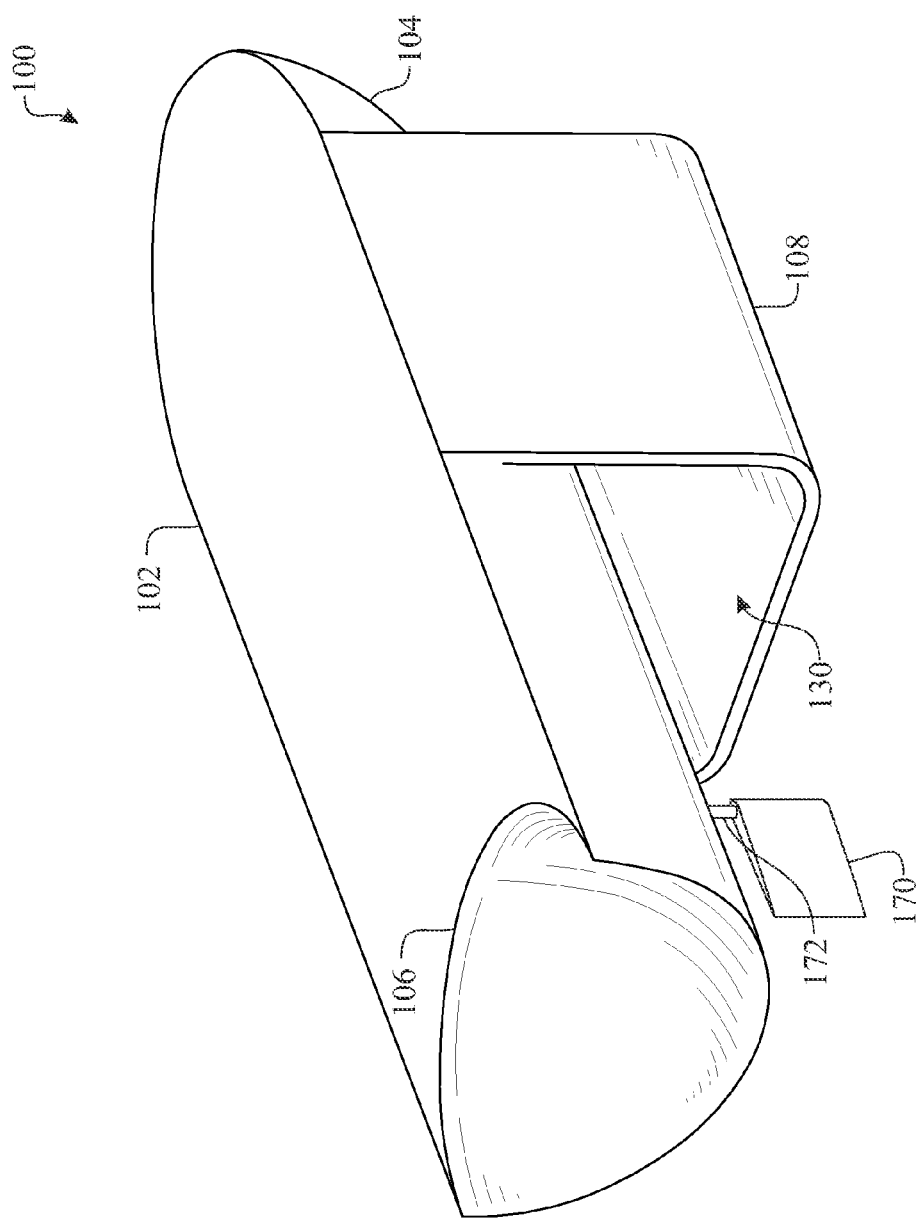
FIG. 8 is a perspective view of a surface watercraft incorporating a propulsion system according to the present invention.
Figure 9:
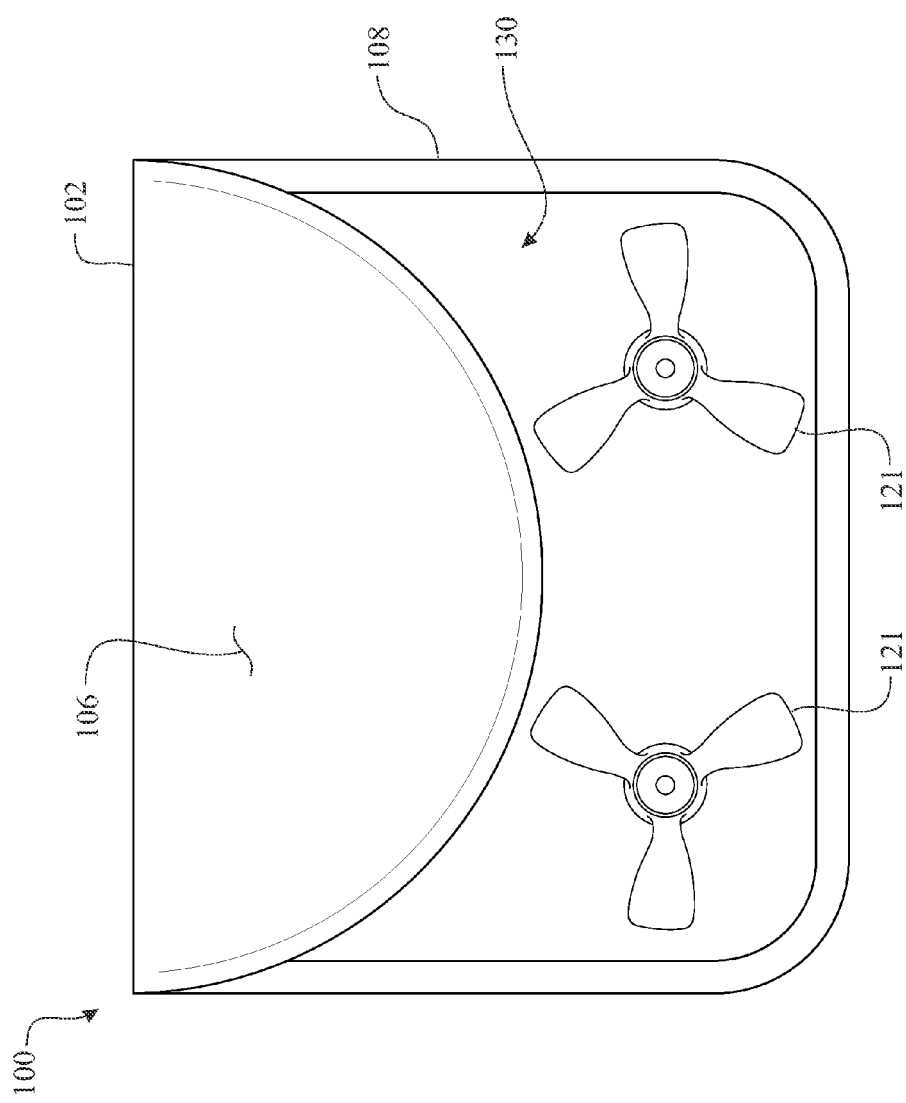
FIG. 9 is a rear elevation view of the surface watercraft of FIG. 8.
Figure 10:
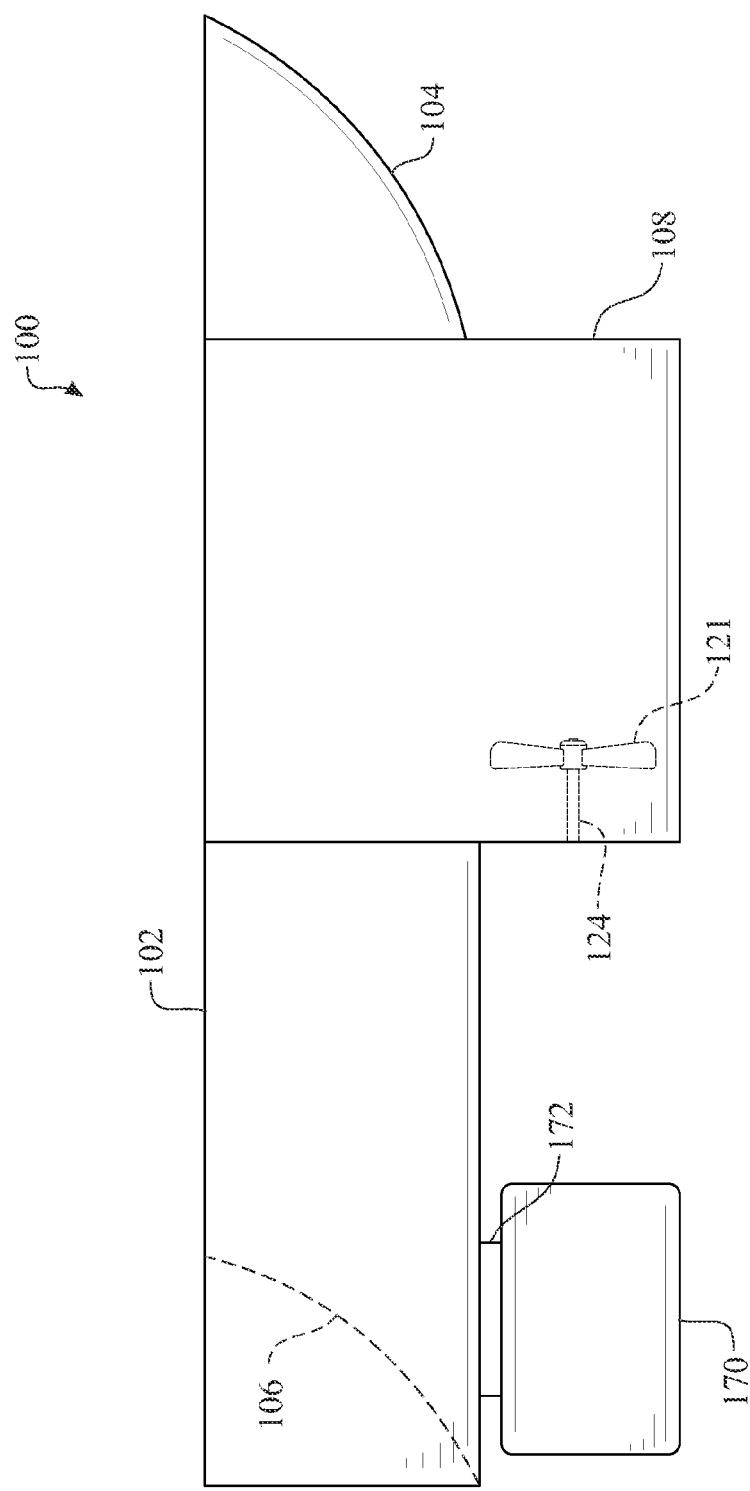
FIG. 10 is a side elevation view of the surface watercraft of FIG. 8.

Turning now to FIGS. 8-10, a watercraft 100 incorporating a propulsion system according to the present invention is illustrated. Watercraft 100 has a hull 102 including an arcuate bow 104 and a stern 106. In a preferred embodiment arcuate bow 104 is convexly arcuate and stern 106 is concavely shaped. A shroud 108 extends from and below a forward portion of hull 102. Shroud 108 in combination with hull 102 defines a longitudinally extending conduit 130 therethrough. The watercraft propulsion system includes a power source (not illustrated) connected to cylindrical structures 124 to drive a flow generator here shown as twin propellers 121 positioned within shroud 108. The flow generator can also be a waterjet or other similar propulsive unit known in the watercraft industry. Positioning the propellers 121 within the shroud 108 additionally reduces tip vortices, which increases the efficiency and performance of the propulsion system.

Watercraft 100 can also include a directional control mechanism 170 such as a rudder to provide directional control of watercraft 100. Directional control mechanism 170 is affixed to hull 102 with a structural mount 172 which can also be a configured as a rotatable shaft to permit rudder to be rotated clockwise or counterclockwise. Rudder 170 can further function as a stator for the flow stream of water beneath hull 102 by being positioned aft of flow generator 121 and within the water flow stream exiting therefrom.

During operation, the power source (not illustrated) drives the flow generator such as by rotating cylindrical structures 124 and propellers 121 to create a forward-to-aft flow of water. Shroud 108 in combination with convexly arcuate bow 104 and the bottom of hull 102 partially forms a funnel shaped path for the forward-to-aft flow of water. The rotating propellers produce a direct forward thrust vector corresponding to thrust vector 45 in FIG. 7 to provide a forward force propelling watercraft 100 in a forward direction. Additionally, the partial funnel shape defined by shroud 108 and bow 104 creates an additional thrust vector through operation of the Bernoulli principle of water flowing forward-to-aft along the convexly arcuate bow 104 and along the underside of hull 102 through conduit 130. The conduit 130 is defined by a pair of side portions of the shroud 108, an upper surface of a horizontal or base portion of shroud 108, and the lower surface of hull 102. The convexly arcuate bow 104 is provided directing uninterrupted fluid flow into the conduit 130. The bow 104 can be of any reasonable shape to direct the water into the conduit 130. The Bernoulli thrust vector operates in addition to the forward thrust vector of propellers 121. The Bernoulli thrust vector is further enhanced by the concave shape of stern 106.

Modern water vessels locate the propulsion mechanisms proximate a stern of the watercraft 100. Placement of the propellers 121 (or other propulsion members) near the arcuate bow 104 of the watercraft 100 draws water from in front of the bow 104/watercraft 100 and under the hull 102. The wave resistance is reduced by drawing water from in front of the bow 104 and passing the water under the hull 102. The forward placement of the propellers 121 clears water from in front of the watercraft 100 overcoming the scenario where the water was not able to "get out of the way of the hull fast enough". Originally, the hull 102, had to climb over or push through the bow wave, resulting in an exponential increase in resistance with increasing speed. By drawing the water rearward from the bow 104 and under the vessel hull 102, the wave build up is drastically reduced. Newton's laws govern the forward motion of the vessel to the wave resistance as well as frictional resistance. The reduction in resistance increases the efficiency of the forward motion. The shroud 108 additionally aids in reducing the bow wave by drawing water into the shroud, drawing the water towards the propulsion members.

Additionally, laminar flow has an increased frictional resistance applied to the hull 102 compared to turbulent flow. In nonscientific terms laminar flow is "smooth", while turbulent flow is "rough." The forward placement of the propellers 121 increases the turbulent flow beneath the hull 102, thus reducing the frictional resistance. The inclusion of the shroud 108 ensures the water drawn from in front of the bow 104 is directed and retained beneath the hull 102.

Figure 11:
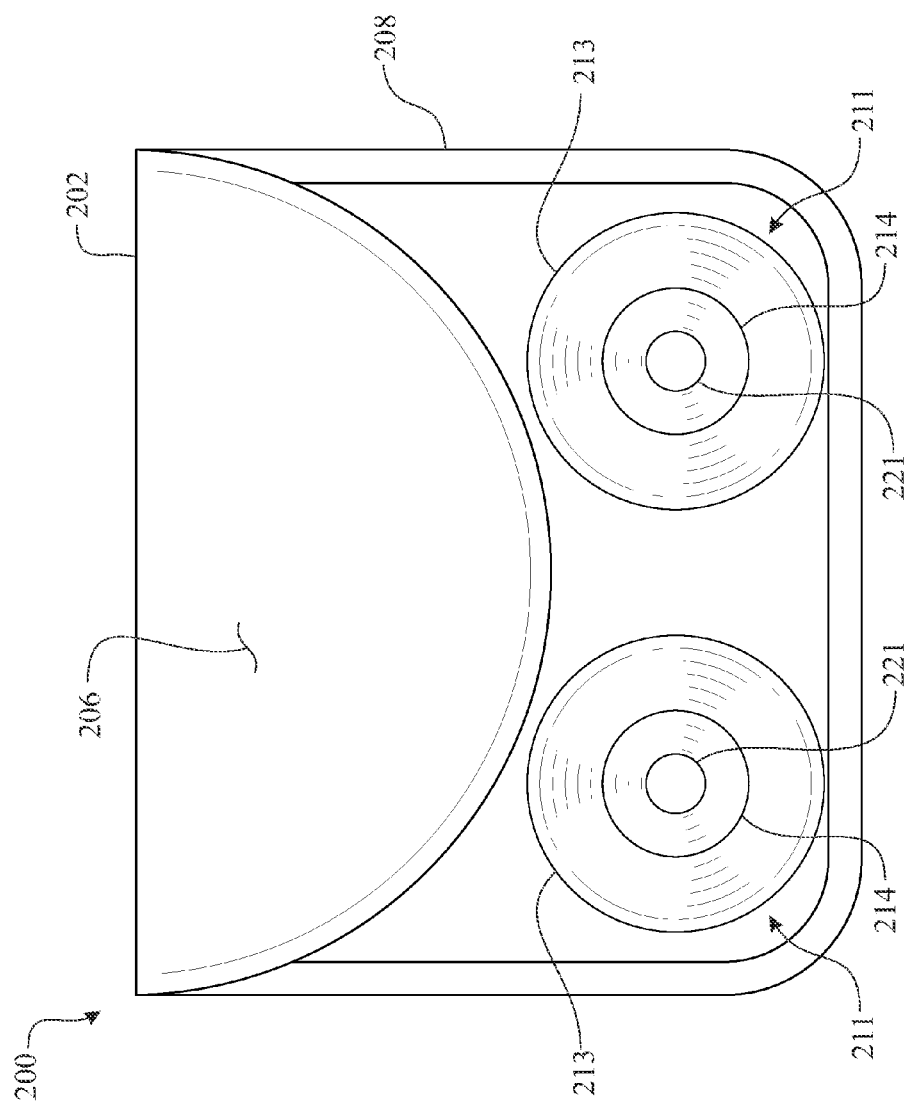
FIG. 11 is a rear elevation view of an alternate embodiment surface watercraft wherein the propellers are further shrouded.
Figure 12:
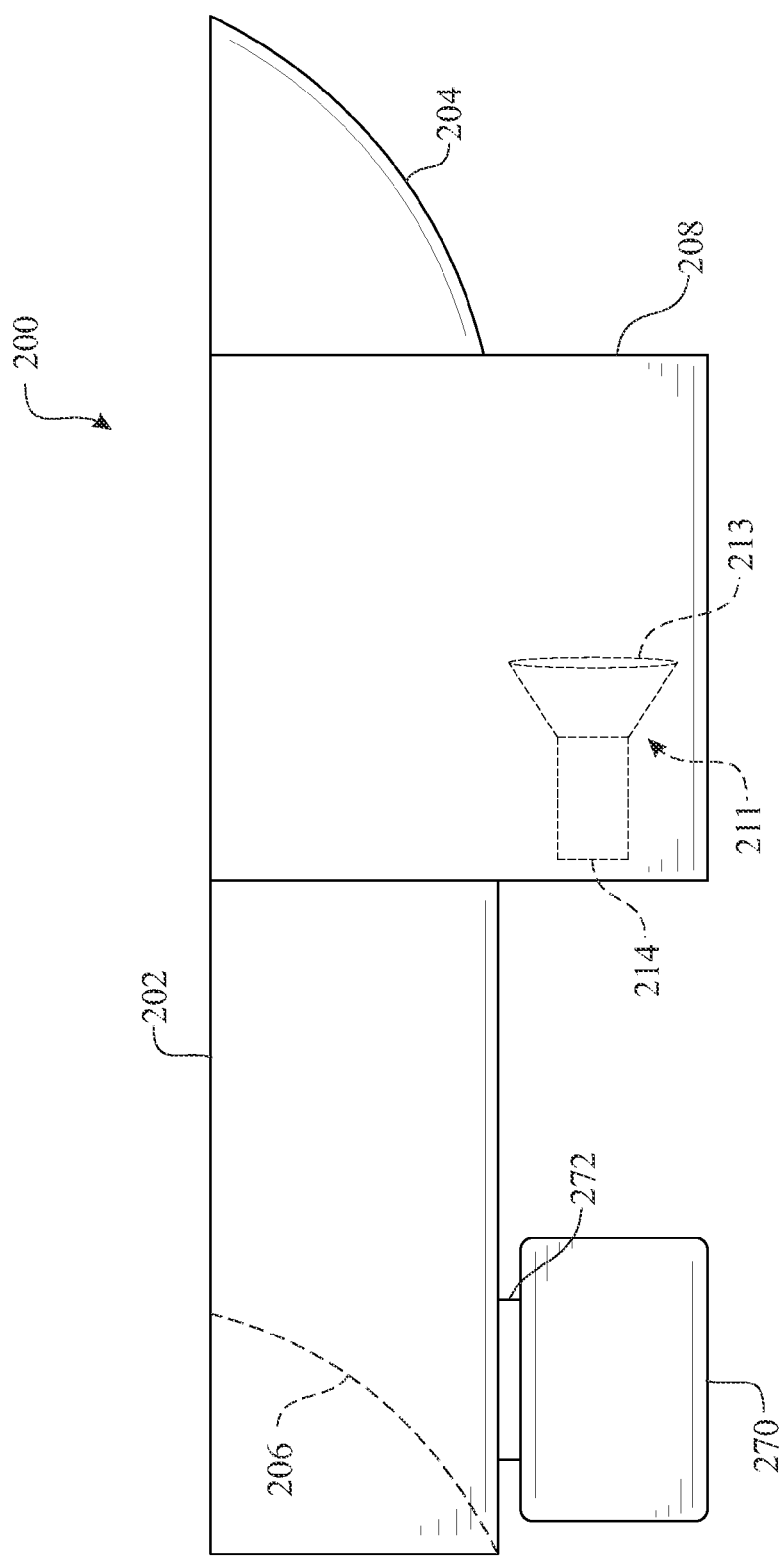
FIG. 12 is a side elevation view of the surface watercraft of FIG. 11.

Turning now to FIGS. 11-12, another exemplary watercraft embodiment 200 is illustrated. Watercraft 200 includes a hull 202 having a convexly arcuate bow 204 and a concave stern 206, which, as illustrated with watercraft 100 above, provides a forwardly directed Bernoulli thrust vector. A shroud 208 extends downwardly from hull 202 and defines a funnel shaped conduit 211 having a large fluid inlet 213 and a smaller fluid outlet 214. A propeller functioning as flow generator 121 is positioned in fluid outlet 214. Watercraft 200 also includes a directional control device 270, which is mounted to hull 202 with support structure 272 as with watercraft 100 above. In operation, flow generator 121 produces a primary forward thrust vector and the forward-to-aft water flow along the convex bow 204 past the concave stern 206 creates a first Bernoulli forward thrust vector and the flow of water through funnel shaped conduit 211 adds another second Bernoulli thrust vector to add additional propulsive thrust to watercraft 200.

The effectiveness of the watercraft embodiment 200 is similar to that of the watercraft 100 above. Wave resistance is primarily a build up of water in front of the watercraft 100. Additional wave resistance is generated by waves flowing outward from the hull 102 as the watercraft 100 is propelled through the water. By ensuring the fluid flow is directed beneath the hull 102, the watercraft 200 minimizes outward flowing wave resistance.

It is understood that additional efficiency features, such as a bulbous bow, a knife bow, and the like may be integrated into the hull 102 to further increase operational efficiency.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

We claim:

1. A watercraft including a propulsion system, said watercraft comprising:
    an elongate hull having an arcuately shaped bow, a stem, and a hull lower surface extending therebetween;
    a shroud extends between a forward edge defining a fluid entrance and a rear edge defining a fluid outlet, said shroud forward edge is located rearward of said arcuately shaped bow with said shroud extending below a forward portion of said hull lower surface, said shroud in combination with said hull lower surface defining a conduit therethrough, said conduit comprising a fluid flow entry orifice partially comprising a section of said arcuately shaped bow extending forward of said shroud forward edge ensuring water drawn from a volume of water in front of the bow is directed beneath the hull and into said conduit and said fluid outlet arranged to direct a discharging fluid flow beneath said hull lower surface and rearward towards said stem,
    said propulsion system comprises a fluid flow generator, the shroud and a forward portion of said elongated hull lower surface; and wherein:
    said arcuately shaped bow and said conduit in combination at least partially form a funnel shaped forward-to-aft fluid path for water flow induced by said flow generator, said flow generator in operation producing a forward thrust vector and a Bernoulli thrust vector created by the forward-to-aft fluid flow of water flow along said partial funnel shaped forward-to-aft fluid path, wherein the fluid flow rate is greater at the bow of the hull compared to that fluid flow rate a stem of the hull, which generates the Bernoulli thrust in addition to a thrust generated by Newton's third law, wherein said Newton generated thrust is generated by the fluid flow generator.

2. The watercraft according to claim 1 wherein said conduit is funnel shaped defining a large opening at a forward end of said conduit and a small opening at an aft end of said conduit.

3. The watercraft according to claim 2 wherein said bow is arcuately shaped.

4. The watercraft according to claim 2 wherein said flow generator is positioned at said small opening at said aft end of said conduit.

5. The watercraft according to claim 1 wherein said flow generator is a propeller.

6. The watercraft according to claim 1 wherein said flow generator is two propellers.

7. The watercraft according to claim 1 wherein said flow generator is a waterjet.

8. The watercraft according to claim 1 wherein said bow is convexly arcuate.

9. The watercraft according to claim 1 wherein said hull defines a concave stern.

10. The watercraft according to claim 1 further including a directional control mechanism below an aft portion of said hull.

11. The watercraft according to claim 10 wherein said directional control mechanism is a controllable rudder.

12. The watercraft according to claim 11 wherein said rudder is positioned aft of said flow generator and within an aft flowing stream of water exiting from said flow generator to function as a stator to stabilize the aft flowing stream of water.

13. A watercraft including a propulsion system, said watercraft comprising:
an elongate hull having an convexly arcuately shaped bow, a concave stern, and a hull lower surface extending therebetween;
a shroud extends between a forward edge defining a fluid entrance and a rear edge defining a fluid outlet, said shroud forward edge is located rearward of said arcuately shaped bow with said shroud extending below a forward portion of said hull lower surface, said shroud in combination with said hull lower surface defining a conduit therethrough, said conduit comprising a fluid flow entry orifice partially comprising a section of said arcuately shaped bow extending forward of said shroud forward edge ensuring water drawn from a volume of water in front of the bow is directed beneath the hull and into said conduit and said fluid outlet arranged to direct a discharging fluid flow beneath said hull lower surface and rearward towards said stern;
said propulsion system comprises a fluid flow generator, said shroud and a portion of said elongated hull lower surface; and wherein:
said arcuately shaped bow and said conduit in combination at least partially form a funnel shaped forward-to-aft fluid path for water flow induced by said flow generator, said flow generator in operation producing a forward thrust vector and a Bernoulli thrust vector created by the forward-to-aft fluid flow of water flow along said partial funnel shaped forward-to-aft fluid path, wherein the fluid flow rate is greater at the bow of the hull compared to that fluid flow rate a stern of the hull, which generates the Bernoulli thrust in addition to a thrust generated by Newton's third law, wherein said Newton generated thrust is generated by the fluid flow generator.

14. The watercraft according to claim 13 wherein said conduit is funnel shaped defining a large opening at a forward end of said conduit and a small opening at an aft end of said conduit.

15. The watercraft according to claim 14 wherein said flow generator is positioned at said small opening at said aft end of said conduit.

16. The watercraft according to claim 13 wherein said flow generator is a propeller.

17. The watercraft according to claim 13 wherein said flow generator is two propellers.

18. The watercraft according to claim 13 wherein said flow generator is a waterjet.

19. The watercraft according to claim 13 further including a directional control mechanism below an aft portion of said hull.

20. The watercraft according to claim 19 wherein said directional control mechanism is a controllable rudder.

21. The watercraft according to claim 20 wherein said rudder is positioned aft of said flow generator and within an aft flowing stream of water exiting from said flow generator to function as a stator to stabilize the aft flowing stream of water.

22. The watercraft according to claim 1 wherein said flow generator positioned in said conduit.

23. The watercraft according to claim 13 wherein said flow generator positioned in said conduit.

* * * * *